(12) United States Patent
Haimer

(10) Patent No.: US 6,726,223 B2
(45) Date of Patent: Apr. 27, 2004

(54) ADJUSTABLE-LENGTH TOOL HOLDER

(75) Inventor: Franz Haimer, Hollenbach-Igenhausen (DE)

(73) Assignee: Franz Haimer Maschinenbau KG, Hollenbach-Igenhausen (DE)

( * ) Notice: Subject to any disclaimer, the term of this patent is extended or adjusted under 35 U.S.C. 154(b) by 0 days.

(21) Appl. No.: 10/163,375

(22) Filed: Jun. 7, 2002

(65) Prior Publication Data

US 2003/0132582 A1 Jul. 17, 2003

(30) Foreign Application Priority Data

Jan. 11, 2002 (DE) .......................... 202 00 398

(51) Int. Cl.$^7$ .............................................. B23B 31/10
(52) U.S. Cl. ................ 279/103; 279/105.1; 408/239 A; 409/234
(58) Field of Search ........................ 279/102, 9.1, 43.4, 279/43.5, 43.2, 46.1, 46.2, 46.3, 46.4, 46.5, 105.1, 103; 408/226, 240, 239 A; 29/447; 403/273, 28–30; 409/232, 234

(56) References Cited

U.S. PATENT DOCUMENTS

| 1,841,635 | A | * | 1/1932 | Salmon | ...................... 279/145 |
| 1,867,359 | A | | 7/1932 | Higby | |
| 2,752,965 | A | * | 7/1956 | Mackey | ...................... 408/226 |
| 3,678,632 | A | * | 7/1972 | Eversole et al. | ........ 408/239 A |
| 4,808,049 | A | * | 2/1989 | Cook | .......................... 279/46.2 |
| 5,311,654 | A | * | 5/1994 | Cook | ........................... 29/447 |
| 6,171,033 | B1 | * | 1/2001 | Wrobel | ....................... 249/145 |
| 6,315,506 | B1 | * | 11/2001 | Mizoguchi | .................... 29/447 |

FOREIGN PATENT DOCUMENTS

| EP | 1 004 378 A1 | 5/2000 |
| WO | WO 99/02297 | 1/1999 |

OTHER PUBLICATIONS

Austrian Office Action dated Feb. 6, 2002.

* cited by examiner

*Primary Examiner*—Daniel W. Howell
(74) *Attorney, Agent, or Firm*—Rothwell, Figg, Ernst & Manbeck, P.C.

(57) ABSTRACT

The adjustable-length tool holder for a rotating tool comprises a base element (7) which is provided with a coupling shank (9) for connecting to a machine tool and which, axially remote from the coupling shank (9), ends in a sleeve part (11) forming a central locating opening (13). The tool holder also comprises a plurality of tubular-cylindrical extension sleeves (15, 19) which in turn each form a central locating opening (17, 21) and of which a first extension sleeve (15) is arranged in an interference fit in the locating opening (13) of the sleeve part (11) in such a way that it can be positioned in an axially variable manner, and each of the further extension sleeves (19) is arranged in an interference fit in the locating opening (17) of the adjacent extension sleeve (15) toward the base element (7) in such a way that it can be positioned in an axially variable manner. The tool is arranged with its shank (3) in an interference fit in the locating opening (21) of the extension sleeve (19) located furthest away from the base element (7).

18 Claims, 2 Drawing Sheets

ADJUSTABLE-LENGTH TOOL HOLDER

The invention relates to an adjustable-length tool holder for a rotating tool.

Conventional tool holders for rotating tools, for example drills, milling cutters or reaming tools, as have been disclosed, for example, by U.S. Pat. No. 5,311,654, have a base element which is provided with a coupling shank for connecting to a machine tool and which, axially remote from the coupling shank, ends in a sleeve part forming a central locating opening. The coupling shank may be a conventional standard connection, for example in the form of a steep-angle taper or the like. The sleeve part accommodates the shank of the tool in an interference fit and can be thermally widened by means of a heating device, preferably an inductive heating device, so that the tool shank, firmly seated in the sleeve part in the cooled state, can be axially inserted into or removed from the locating opening of the sleeve part.

Furthermore, it is known from U.S. Pat. No. 5,311,654 to design the tool holder in two pieces. A tubular-cylindrical reducing sleeve is shrunk into position in the locating opening of the base element, this reducing sleeve in turn forming a locating opening for the tool shank. The reducing sleeve also accommodates the tool shank in an interference fit and projects beyond the sleeve part of the base element with its region which transmits the interference-fit forces, so that the reducing sleeve, irrespective of whether or not it is inserted into the base element, can be widened thermally, for example by means of the induction heating device, in order to change the tool.

The locating opening of both the sleeve part and the reducing sleeve extends over the entire axial length of the tool holder and is provided with a plurality of grooves, for example 4 grooves, in the inner lateral-surface region which transmits the interference-fit forces to the tool shank, via which grooves cooling fluid can be fed through the tool holder to the tool during operation of the latter.

In practice, it is desirable to have adjustable-length tool holders, in particular in the form of the heat-shrinkable tool holders explained above. In conventional heat-shrinkable tool holders, although the tool shank can be axially positioned in many cases, there are comparatively strict limits to this possibility due to the fact that the dimensions of the tool holder are always fixed. The object of the invention is to specify a heat-shrinkable tool holder which enables the tool to be selectively positioned relative to the coupling shank within very wide limits without impairing the torque-transmitting properties of the tool holder.

To achieve this object, an adjustable-length tool holder for a rotating tool is proposed according to the invention, this adjustable-length tool holder comprising:

a base element, which is provided with a coupling shank for connecting to a machine tool and which, axially remote from the coupling shank, ends in a sleeve part forming a central locating opening, and a plurality of tubular-cylindrical extension sleeves which in turn each form a central locating opening and of which a first extension sleeve is arranged in an interference fit in the locating opening of the sleeve part in such a way that it can be positioned in an axially variable manner, and each of the further extension sleeves is arranged in an interference fit in the locating opening of the adjacent extension sleeve toward the base element in such a way that it can be positioned in an axially variable manner, the tool being arranged with its shank in an interference fit in the locating opening of the extension sleeve located furthest away from the base element, and it being possible for that region of the sleeve part and of each of the extension sleeves which transmits the interference-fit forces to be widened by heating, in particular by means of an induction heating device, for the insertion or positioning or removal of the extension sleeve or of the tool shank.

In such a tool holder, the extension sleeves are telescopic relative to one another and to the sleeve part of the base element, so that the axial length of the tool holder overall can be varied within very wide limits. The surfaces participating in the transmission of the interference-fit forces and assigned to one another can be produced in a highly precise manner, so that precise concentricity properties are achieved despite variable positioning. The outside diameters of the extension sleeves expediently correspond to standard diameters of tool shanks, so that the number of extension sleeves used for the extension can be selected in accordance with the practical requirements, and, if need be, with a set of extension sleeves stepped in outside diameter or/and inside diameter, not only can the axial length of the tool holder be varied, but the tool holder can also be adapted to the nominal diameter of the tool shank ultimately to be clamped.

In a preferred configuration, provision is made for that region of the sleeve part and of the extension sleeves which transmits the interference-fit forces to in each case reach essentially up to the front end axially remote from the coupling shank, and for the locating opening of the sleeve part or/and of the extension sleeves to be extended beyond the region which transmits the interference-fit forces axially toward the coupling shank and to be enlarged in diameter relative to the diameter of the region which transmits the interference-fit forces. Since the region which transmits the interference-fit forces reaches up to the axial front end, the tool holder has improved torque-transmitting properties. The region which transmits the interference-fit forces has a defined axial length, preferably about 2 to 3 times the diameter of the locating opening, a factor which facilitates the thermal widening, since it can remain limited to the defined region. Nonetheless, the telescopic length of each extension sleeve and of the sleeve part may be selected to be considerably larger, since the region accommodating the telescopic excess length is enlarged in diameter. The axial length of that region of the locating opening of at least the extension sleeves which is enlarged in diameter is expediently at least 1.5 times, preferably at least 2 times, the axial length of the region which transmits the interference-fit forces.

In a preferred configuration, provision is made for a plurality of axially elongated slots which are distributed in the peripheral direction of the locating opening and which are open toward the locating opening but do not pass radially completely through the extension sleeve to start from that end of the region of at least the extension sleeve of smallest diameter which is axially remote from the coupling shank, this region transmitting the interference-fit forces. If they are present in sufficient number, slots of this type increase the effective diameter for the shrink-fitting expansion in the region which transmits the interference-fit forces relative to the inside diameter of the locating opening and thus reduce the requirements for maintaining production tolerances. This is especially important in the case of small inside diameters if seizing problems are to be avoided when shrinking the tool shank or possibly the extension sleeves in position. The slots are incorporated in the extension sleeve, which is otherwise closed in a ring shape. Each of the extension sleeves or/and the sleeve part are provided with such slots increasing the effective diameter for the shrink-fitting expansion.

The slots preferably start essentially directly at the front end axially remote from the coupling shank and extend in the axial direction expediently over at least 5–10 mm, since the shrink-on problems are greatest here, but preferably at least over the length of that region of the locating opening which transmits the interference-fit forces and may, if need be, have a radial depth which changes in the axial direction, in particular a radial depth decreasing from the insertion side of the tool shank toward the coupling shank.

In order to reduce the contact surface of the locating opening as little as possible, this contact surface transmitting the torque, the width of the slots in the peripheral direction is as small as possible. The slots expediently have a width of between 0.1 mm and 0.5 mm in the peripheral direction. In order to be able to produce them in a simple manner despite the small width, the slots have essentially parallel slot walls.

The radial depth of the slots determines the increase in the diameter, effective for the thermal expansion, of the region which transmits the interference-fit forces. The radial depth is dimensioned in such a way that an effective expansion diameter is obtained which enables the locating opening to be produced with sufficiently large tolerances, which are thus simple to realize. Since the effective expansion diameter of the sleeve part is to be all the greater, the smaller the nominal diameter of the locating opening is, provision is made in a preferred configuration for the radial depth of the slots in that region of the locating opening which transmits interference-fit forces, at a nominal diameter of the locating opening of less than or equal to 10 mm, to be greater than 0.1 times the nominal diameter, preferably equal to or greater than 0.2 times the nominal diameter. In this case, the nominal diameter is the value of the outside diameter of the element accommodated in the region which transmits interference-fit forces. At a nominal diameter of the locating opening of less than or equal to 6 mm, the radial depth of the slots is preferably greater than 0.15 times the nominal diameter, but better equal to or greater than 0.3 times the nominal diameter, and, at a nominal diameter of the locating opening of less than or equal to 3 mm, the radial depth is expediently greater than 0.2 times the nominal diameter, but preferably equal to or greater than 0.5 times the nominal diameter. These dimensions ensure that the web regions of the sleeve part which remain between the slots are still sufficiently flexurally rigid during torque loading.

The number of slots arranged in the peripheral direction preferably at equal angular distances is to be a compromise between, on the one hand, sufficient bearing capacity of the web regions remaining between the slots and, on the other hand, the improvement in the expansion behavior of the extension sleeve. At least 6 slots, but better at least 8 slots, are expediently provided. In order not to excessively reduce the contact surface effective during the torque transmission, at least 20 slots are expediently provided.

The radially outer bases of the slots preferably lie on the lateral-surface contour of a cone having a cone apex axially facing the coupling shaft. This also facilitates the production of relatively narrow slots, for example by the electrical-discharge wire cutting process.

The exemplary embodiments of the invention are preferably explained in more detail below with reference to a drawing, in which.

Figure 1A:
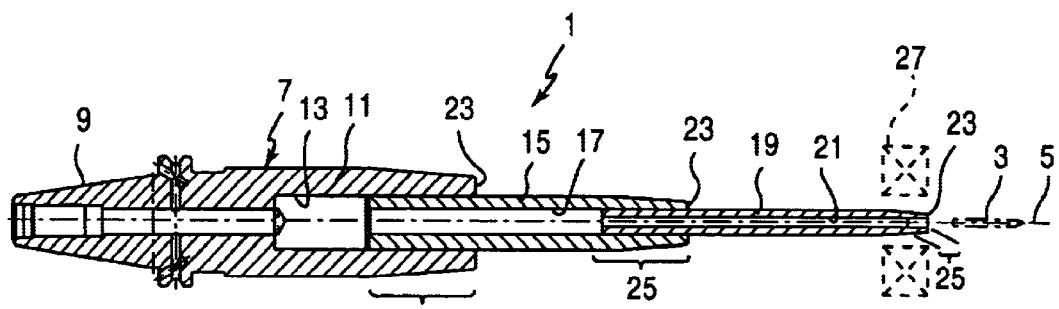
FIG. 1A shows an axial longitudinal section through a double-telescopic tool holder according to the invention in the maximum extended position.
Figure 1B:
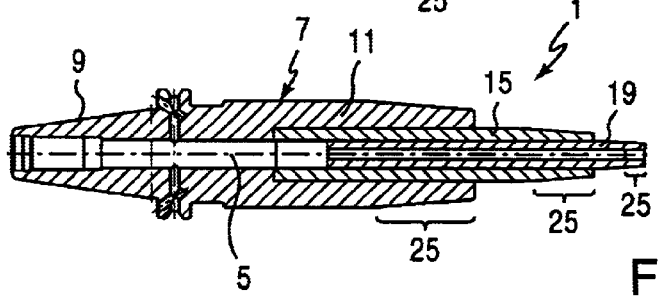
FIG. 1B shows the tool holder from FIG. 1A in the fully shortened position.

FIGS. 1A and 1B show a telescopic tool holder 1, on the one hand extended to its maximum length (FIG. 1A) and on the other hand telescoped to its minimum length (FIG. 1B). The tool holder 1, intended for accommodating a tool, for example a drill, a milling cutter or a reaming tool, indicated with its tool shank at 3 and rotating about a rotation axis 5 during operation, has a base element 7 which, at its axial end remote from the tool, is provided with a coupling shank 9 for connecting to a rotationally driven machine spindle (not shown). In the exemplary embodiment shown, the coupling shank 9 is designed as a standard steep-angle taper.

On its side close to the tool, the base element 7 merges into a sleeve part 11 which contains a locating opening 13 which is concentric to the rotation axis 5 and has a circular-cylindrical contour. Sitting in an interference fit in the locating opening 13 of the sleeve part 11 is a tubular-cylindrical extension sleeve 15, which, in its axially continuous locating opening 17 likewise of circular-cylindrical contour, contains a further extension sleeve 19 in an interference fit. The extension sleeve 19 also has an axially continuous locating opening 21, which accommodates the tool shank 3 likewise in an interference fit in a manner to be explained in more detail below. The torque exerted on the coupling shank 9 by the machine spindle is transmitted to the tool shank 3 via the interference-fit connections.

Each of the locating openings 13, 17, 21 of both the sleeve part 11 and the extension sleeves 15, 19 transmits the interference-fit forces only in a region 25 which essentially directly adjoins the tool-side front end 23 of the sleeve part 11 and of the extension sleeves 15, 19, respectively. Each of the locating openings 13, 17, 21 is extended toward the coupling shank 9 and is enlarged in its diameter to such an extent that it is able to accommodate the extension sleeve, held in an interference fit in the region 25, with comparatively small radial clearance.

The sleeve part 11 and the extension sleeves 15, 19 are made of high-temperature steel and can each be heated by means of an induction heating device (indicated schematically at 27) in the region which transmits interference-fit forces and can thus be widened thermally up to a diameter which enables the extension sleeve 15 or 19 or the tool shank 3 to be displaced axially relative to the associated locating opening 13 or 17, respectively, or 21 or inserted into or removed from the locating opening. After the region 25 has cooled down, the sleeve part 11 or the extension sleeves 15, 19 shrink back again to the size producing the interference-fit forces. Suitable inductive heating devices are explained in WO 01/89 758 A1.

The region which transmits the interference-fit forces has an axial length which is about 2 to 3 times the outside diameter of the element to be held in this region 25. Thus, for example, the region 25 of the extension sleeve 19, in the axial direction, is about two to three times as long as the thickness of the tool shank 3 in its section to be clamped. That region of at least the locating openings 17, 21 of the extension sleeves 15, 19 which is enlarged in diameter and axially adjoins the region 25 is at least 2 times longer than the region 25, which transmits interference-fit forces, of this locating opening. For reasons of cost, that region of the locating opening 13 of the base element 7 which is enlarged in diameter may also be shorter, if need be, than that region 25 of the sleeve part 11 which transmits interference-fit forces, in particular if the base element 7 is provided with regulating elements for the axial presetting of the tool relative to the base element 7.

Figure 2A:
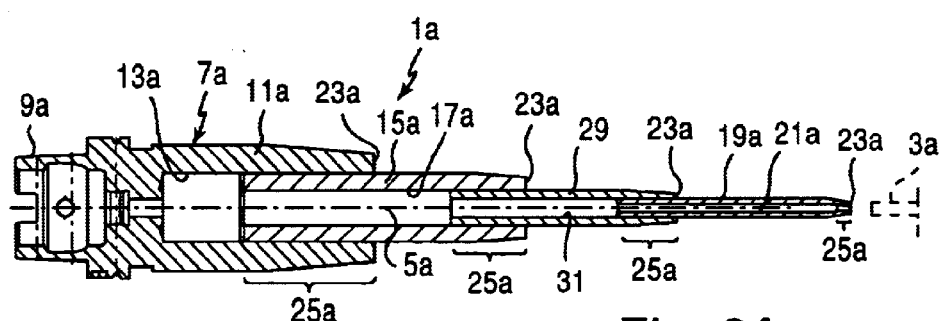
FIG. 2A shows an axial longitudinal section through a triple-telescopic tool holder according to the invention in the maximum extended position.
Figure 2B:
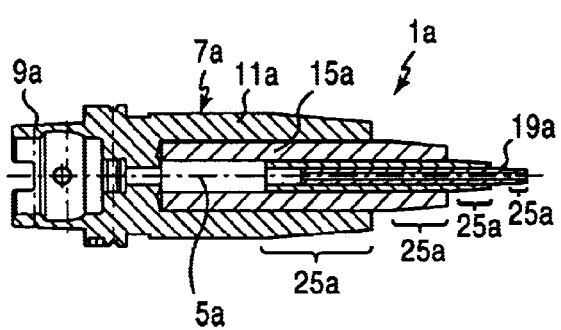
FIG. 2B shows the tool holder from FIG. 2A in the minimum position.

FIGS. 2A and 2B show a variant of a triple-telescopic tool holder which differs from the tool holder in FIGS. 1A and 1B merely by the increased number of its extension sleeves and the nature of its coupling shank. Here, as well as in the explanation of further variants below, components acting in the same way are designated by the reference numerals in FIGS. 1A and 1B and are provided with a letter for differentiation. For the explanation of the construction and of the functioning, reference is made to the description of FIGS. 1A and 1B.

The telescopic tool holder 1a, shown in the fully extended state in FIG. 2A and in the fully shortened state in FIG. 2B, is provided with a coupling shank 9a designed as an HSK taper for connecting to the machine spindle and contains a third extension sleeve 29 which corresponds in its construction and its function to the extension sleeves 15a and 19a and, in the exemplary embodiment shown, is inserted between the extension sleeves 15a and 19a. The additional extension sleeve 29 increases the useful axial stroke of the tool holder 1a. The extension sleeve 29 also has an axially continuous locating opening 31, which, directly adjoining its front end 23a on the tool side, forms a region 25a transmitting interference-fit forces to the extension sleeve 19a and continues with an enlarged diameter toward the coupling shank 9a, as explained above with reference to FIGS. 1A and 1B. Apart from that, the tool holder 1a is of identical construction to the tool holder 1 and can be thermally expanded in the regions 25a by an inductive heating device for the axial positioning and the insertion or removal of the tool shank 3a. It goes without saying that, if need be, there may also be more than three extension sleeves. A set of extension sleeves which are stepped differently in inside and outside diameter is expediently available to the user in order to be able to adapt the tool holder to different overall-length requirements and/or different tool-shank diameters.

The region 25, which transmits the interference-fit forces, of the locating opening of the sleeve part and also of each extension sleeve of the tool holder explained above may have a circular-cylindrical lateral surface. The diameter of this lateral surface determines the thermal-expansion behavior, for this diameter, in order to release the element held therein in an interference fit, must widen more quickly or/and to a greater extent than the element held in the interference fit if undesirable seizing effects are not to occur. As long as the diameter is relatively large, this is possible as a rule. In the case of small diameters, however, the lateral surface of the locating opening or/and the outer lateral surface of the element to be held in the interference fit, for example of the tool shank, must be produced with sufficiently small tolerances if the shrink removal is to take place without any problems.

Figure 3:
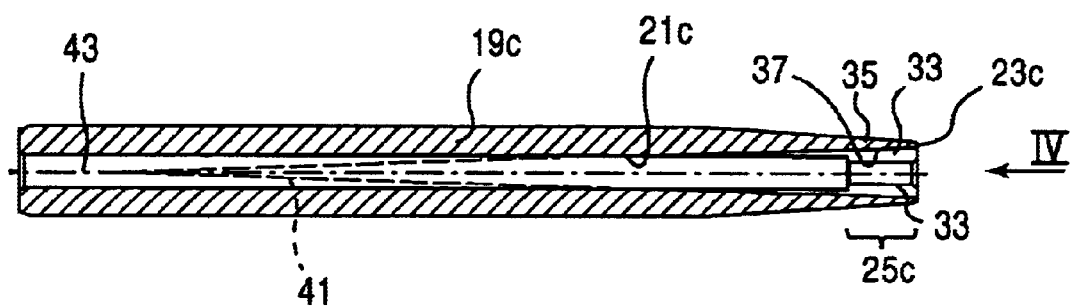
FIG. 3 shows an axial longitudinal section through an extension sleeve which can be used in the tool holders of FIGS. 1 and 2.
Figure 4:
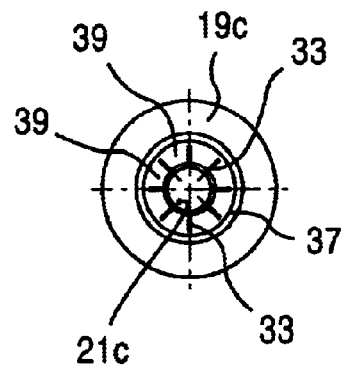
FIG. 4 shows an end view of the extension sleeve as viewed in the direction of an arrow IV in FIG. 3.

Shrink-removal problems may occur, in particular, in the extension sleeve of smallest diameter, as shown in FIG. 1 at 19 or in FIG. 2 at 19a. FIGS. 3 and 4 show a configuration of an extension sleeve 19c, the locating opening 21c of which, in the region 25c which transmits the interference-fit forces, contains at least 6, but at most 20, here 8, axially elongated slots 33 which are open toward the locating opening 21c but do not completely pass through the extension sleeve 19c. The slots 33 start essentially directly at that front end 23c of the extension sleeve 19c which is close to the tool and extend at least 5 to 10 mm in the axial direction, but preferably over the entire region 25c which transmits interference-fit forces. The slots 33 are incorporated directly into the material of the extension sleeve 19c, which is preferably made of high-temperature steel. The peripheral region 35 radially adjoining the region of the slots 33 on the outside is closed in a ring shape. The expansion behavior of this region is now determined by the diameter of the circumcircle containing the radially outer bases 37 of the slots 33 and no longer by the diameter of the locating opening 21c. The locating opening 21c is thus expanded to a greater extent in the region 25c than it would be in the case of an extension sleeve without radial slots and can therefore be correspondingly produced with relatively large tolerances even in the case of small nominal diameters.

As already described above, the locating opening 21c is stepped. On the side remote from the tool, a region having a somewhat enlarged diameter adjoins the region 25c which transmits the interference-fit forces, so that the tool shank to be clamped is held solely in the region 25c. Here, too, the region 25c has a length equal to about 2 to 3 times the nominal diameter to be clamped.

In order to keep the surface in contact with the tool shank as large as possible, which surface transmits the torque, the slots 33 are as narrow as possible, for example between 0.1 mm and 0.5 mm, better less than 0.4 mm, wide in the peripheral direction. The slot walls run parallel to one another in order to configure the web regions 39, situated between the slots 33, for the purpose of high flexural rigidity during torque loading. The number of slots 33 between 6 and 20, preferably 8 slots, also represents a compromise between a sufficiently large contact surface of the locating opening 19c on the one hand and sufficient flexural rigidity of the web regions 39 on the other hand.

The radial depth of the slots 33 expediently depends on the nominal diameter of the locating opening 19c. In a region having a nominal diameter of the tool shank of less than/equal to 3 mm, the radial depth of the slots is selected to be equal to or greater than 0.5 times the nominal diameter. With increasing nominal diameter, the ratio of the slot depth to the nominal diameter can be reduced. At a nominal diameter between 4 mm and 20 mm, a radial slot depth of 2 mm suffices in the individual case. At a nominal diameter greater than 25 mm, the slot depth should be at least 2.5 mm. The above depth specifications relate to the region of the end face 23c.

Although the slots 33 are to have the abovementioned depth dimensions over the entire axial length, the radial depth of each slot may also be varied in the longitudinal direction. Thus, as FIG. 3 shows, the bases 37 of the slots 33 may also lie on the lateral surface of a cone indicated at 41, the cone apex 43 of which lies close to that end of the extension sleeve 19c which is remote from the tool. Such slots, even if they are very narrow in the peripheral direction, can be produced by an electrical-discharge wire cutting process, for example.

FIGS. 3 and 4 show the configuration of the region, which transmits interference-fit forces, of the extension sleeve located furthest away from the clamping shank. It goes without saying that slots of the above type may be provided not only in the other extension sleeves but also on the sleeve part of the base element.

What is claimed is:

1. An adjustable-length tool holder for a rotating tool, comprising a base element (7), which is provided with a coupling shank (9) for connecting to a machine tool and which, axially remote from the coupling shank (9), ends in a sleeve part (11) forming a central locating opening (13), and a plurality of tubular-cylindrical extension sleeves (15, 19; 15*a*, 19*a*, 29; 19*c*) which in turn each form a central locating opening (17, 21; 17*a*, 21*a*, 31; 21*c*) and of which a first extension sleeve (15; 15*a*) is arranged in an interference fit in the locating opening (13) of the sleeve part (11) in which a way that it can be positioned in an axially variable manner, and each of the further extension sleeves (19; 19*a*, 29; 19*c*) is arranged in an interference fit in the locating opening (17; 17*a*, 31) of the adjacent extension sleeve (15; 15*a*, 29) toward the base element (7) in such a way that it can be positioned in an axially variable manner, the tool being arranged with its shank (3) in an interference fit in the locating opening (21; 21*a*, 21*c*) of the extension sleeve (19; 19*a*; 19*c*) located furthest away from the base element (7) and it being possible for that region (25) of the sleeve part (11) and of each of the extension sleeves (15, 19; 15*a*, 19*a*, 29; 19*c*) which transmits the interference-fit forces to be widened by heating, in particular by means of an induction hearing device, for the insertion or positioning or removal of the extension sleeves (15, 19; 15*a*, 19*a*, 29; 19*c*) or of the tool shank (3).

2. The adjustable-length tool holder as claimed in claim 1, wherein the region (25) of the sleeve part (11) and the extension sleeves (15, 19) which transmit the interference-fit forces in each case reaches essentially up to the front and axially remote from the coupling shank (9), and the locating opening (13, 17, 21) of the sleeve part (11) and/or of the extension sleeves (15, 19) is extended beyond the region (25) which transmit the interference-fit forces axially toward the coupling shank (9) and is enlarged in diameter relative to the diameter of the region (25) which transmits the interference-fit forces.

3. The adjustable-length tool holder as claimed in claim 2, wherein the axial length of that region of the locating opening (13, 17, 21) which is enlarged in diameter is at least 1.5 times the axial length of the region (25) which transmits the interference-fit forces.

4. The adjustable-length tool holder as claimed in claim 2, wherein the axial length of the region (25) which transmit the interference-fit forces is about 2 to 3 times the diameter of the locating opening (13, 17, 21).

5. The adjustable-length tool holder as claimed in claim 1, wherein a plurality of axially elongated slots (33) which are distributed in the peripheral direction of the locating opening (21*c*) and which are open toward the locating opening (21*c*) but do not pass radially completely through the extension sleeve (19*c*) start from that end of the region (25*c*) of at least the extension sleeve (19*c*) of smallest diameter which is axially remote from the coupling shank (9), this region (25*c*) transmitting interference-fit forces.

6. The adjustable-length tool holder as claimed in claim 5, wherein each extension sleeve or/and the sleeve part are provided with slots (33) in the region (25*c*) which transmits interference-fit forces.

7. The adjustable-length tool holder as claimed in claim 5, wherein that region (25) of at least the extension sleeve (19*c*) of smallest diameter which transmits the interference-fit forces reaches essentially right up close to the front end (23*c*) axially remote from the coupling shank.

8. The adjustable-length tool holder as claimed in claim 5, wherein the slots (33) have a length of at least 5 mm in the axial direction.

9. The adjustable-length tool holder as claimed in claim 5, wherein the slots (33) extend essentially over the entire axial length of that region (25*c*) of the locating opening (21*c*) which transmits interference-fit forces.

10. The adjustable-length tool holder as claimed in claim 5, wherein the slots (33) have a width of between 0.1 mm and 0.5 mm in the peripheral direction of the locating opening (21*c*).

11. The adjustable-length tool holder as claimed in claim 5, wherein the slots (33) each have essentially parallel slot walls and their width in the peripheral direction of the locating opening (21*c*) is smaller than their depth in the radial direction.

12. The adjustable-length tool holder as claimed in claim 5, wherein the locating opening (21*c*) has at least 6 slots (33) at the same angular distance in the peripheral direction.

13. The adjustable-length tool holder as claimed in claim 5, wherein the radial depth of the slots (33) in that region of the locating opening (21*c*) which transmits interference-fit forces, at a nominal diameter of the locating opening (21*c*) of less than or equal to 10 mm, is greater than 0.1 times the nominal diameter, or at a nominal diameter of the locating opening (21*c*) of less than or equal to 6 mm, is greater than 0.15 times the nominal diameter or, at a nominal diameter of the locating opening (21*c*) of less than or equal to 3 mm, is greater than 0.2 times the nominal diameter.

14. The adjustable-length tool holder as claimed in claim 5, wherein the radially outer bases (37) of the slots (33) of the extension sleeve (19*c*) lie on the lateral-surface contour (41) of a cone having a cone apex (43) axially facing the coupling shaft.

15. The adjustable-length tool holder as claimed in claim 2, wherein the axial length of that region of the locating opening (13, 17, 21) which is enlarged in diameter is at least 2 times the axial length of the region (25) which transmits the interference-fit forces.

16. The adjustable-length tool holder as claimed in claim 5, wherein the slots (33) have a length of at least 10 mm, in the axial direction.

17. The adjustable-length tool holder as claimed in claim 5, wherein the locating opening (21*c*) has at least 8 slots (33) at the same angular distance in the peripheral direction.

18. The adjustable-length tool holder as claimed in claim 5, wherein the radial depth of the slots (33) in that region of the locating opening (21*c*) which transmits interference-fit forces, at a nominal diameter of the locating opening (21*c*) of less than or equal to 10 mm, is equal to or greater than 0.2 times the nominal diameter or, at a nominal diameter of the locating opening (21*c*) of less than or equal to 6 mm, is greater than 0.3 times the nominal diameter or, at a nominal of the locating opening (21*c*) of less than equal to 3 mm, is equal to or greater than 0.5 times the nominal diameter.

* * * * *